Figure 1:
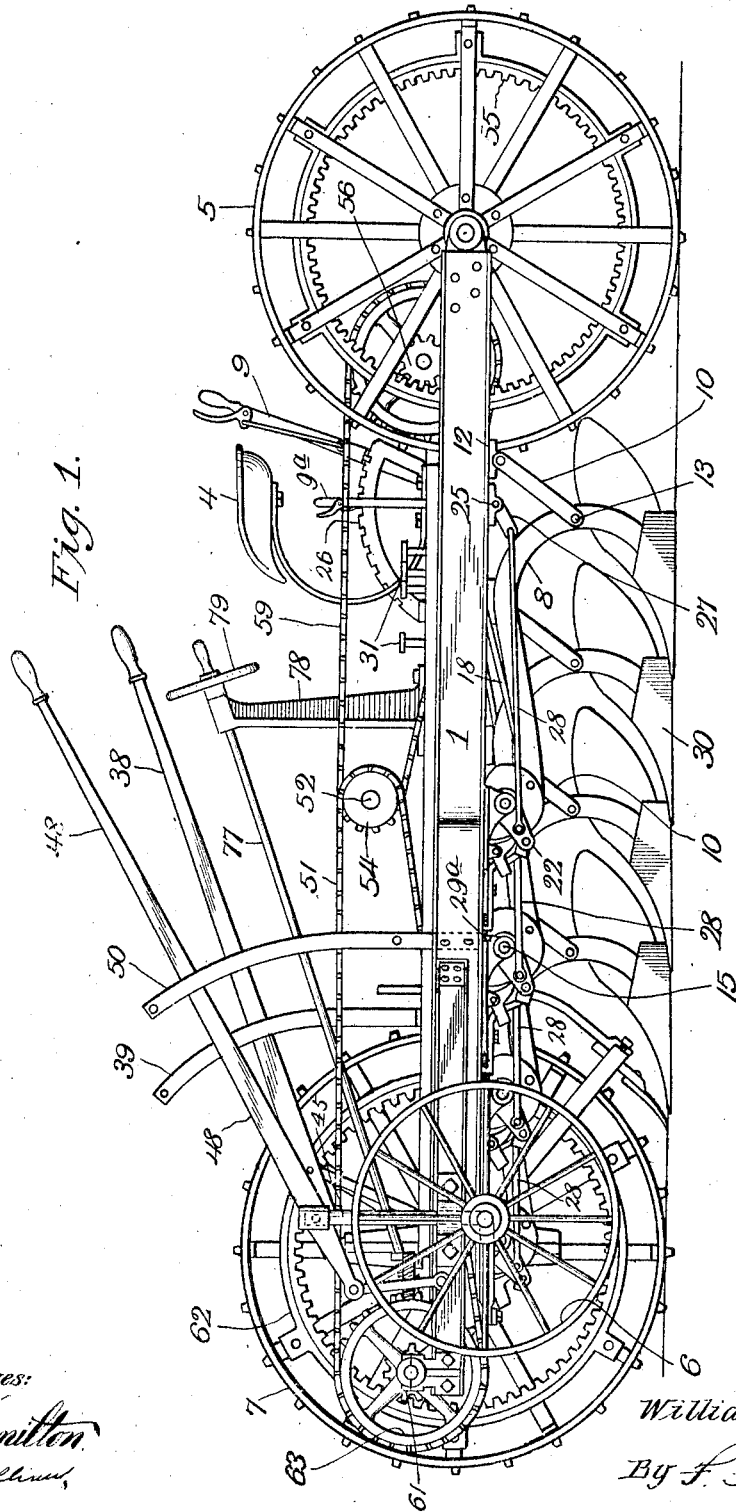

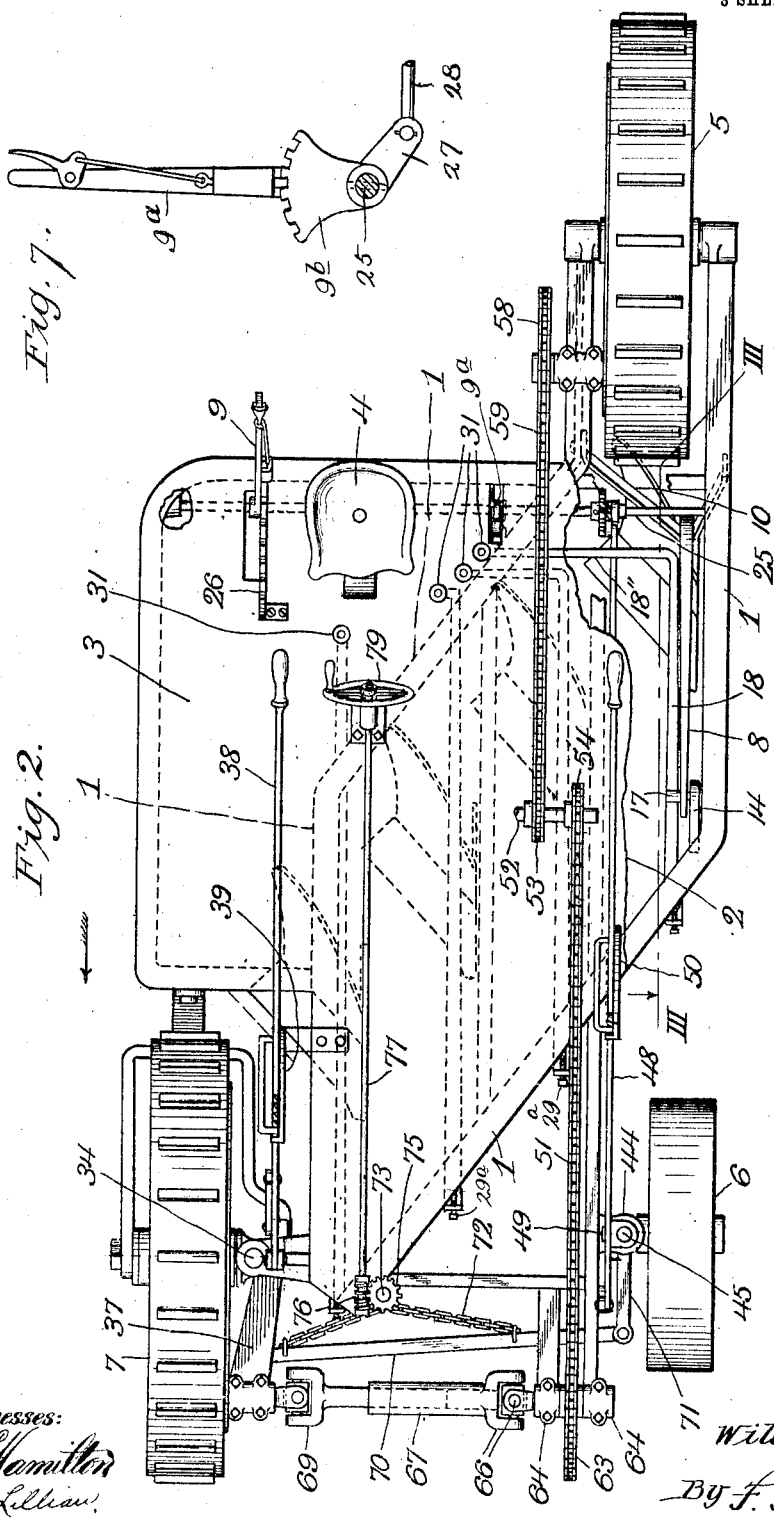

W. CLOW.
AUTOPLOW.
APPLICATION FILED MAR. 2, 1911.
1,088,403.
Patented Feb. 24, 1914.
3 SHEETS—SHEET 3.
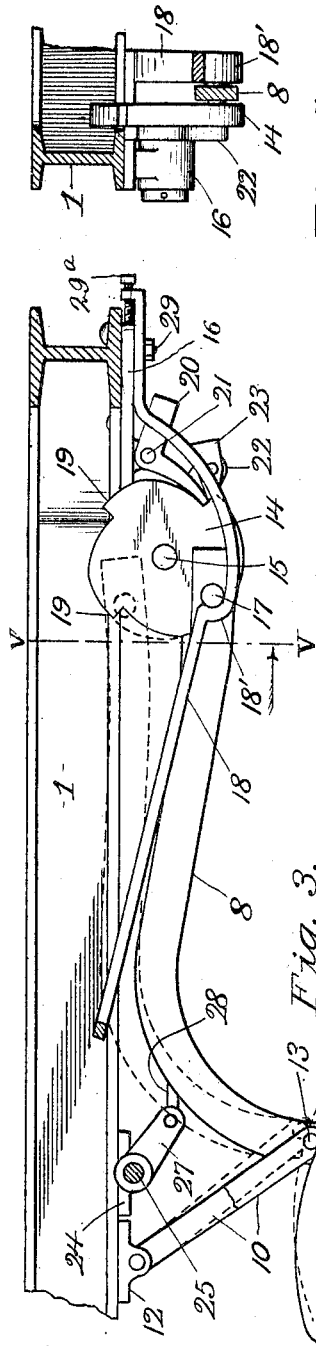
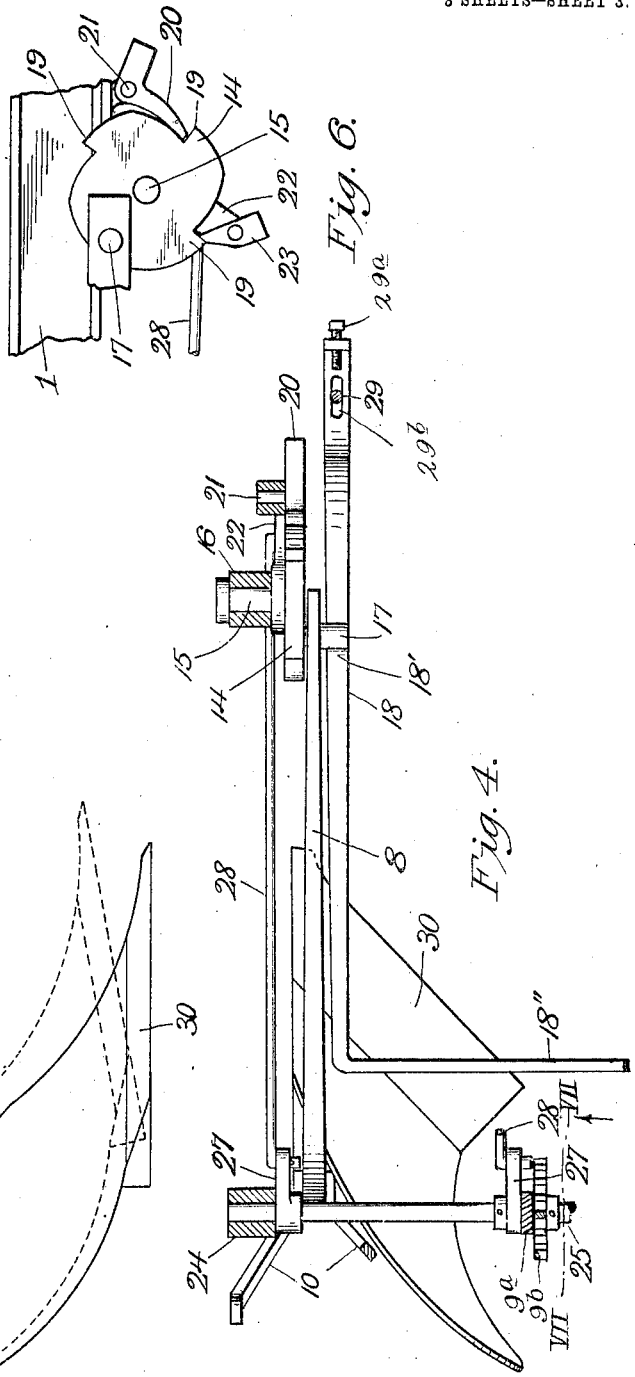
Witnesses:
Inventor,
William Clow,
By F. G. Fischer,
Atty.

UNITED STATES PATENT OFFICE.

WILLIAM CLOW, OF INDEPENDENCE, MISSOURI.

AUTOPLOW.

1,088,403.  Specification of Letters Patent.  Patented Feb. 24, 1914.

Application filed March 2, 1911. Serial No. 611,833.

*To all whom it may concern:*

Be it known that I, WILLIAM CLOW, a citizen of the United States, residing at Independence, in the county of Jackson and State of Missouri, have invented certain new and useful Improvements in Autoplows, of which the following is a specification.

My invention relates to auto gang plows, and one object of the invention is to provide a motor-driven plow wherein the plow-beams forming part of the gang may be either simultaneously or independently raised or lowered.

Another object is to provide improved mechanism for removing the plow shares from working position, or for lowering them to such position, the action of said mechanism being such as to facilitate either of said operations by inclining the shares upwardly or downwardly.

In order that the invention may be fully understood, reference will now be made to the accompanying drawings, in which:

Figure 1 is a side elevation of a gang plow constructed in accordance with the invention, the motor being omitted. Fig. 2 is a top plan view of the same, a portion of the platform being broken away and the motor omitted. Fig. 3 is an enlarged section on line III—III of Fig. 2, showing one of the plows and its governing mechanism. Fig. 4 is a top view of the parts shown in Fig. 3, omitting the frame beam and showing bearings in section. Fig. 5 is a detail view in section on line V—V of Fig. 3. Fig. 6 is a detail view of a portion of Fig. 3, showing the wheel turned to a different position and omitting the part 18. Fig. 7 shows means for raising and lowering a plow independently of the others.

In Fig. 2, 1, designates the main frame, which is rhomboidal in plan and is preferably constructed of steel or iron beams, which are shown in section in several of the detail views. This frame is covered by a main platform 2, and an extension platform 3 is also provided for the convenience of the operator, whose seat 4 is mounted thereon.

The frame is supported by a rear traction wheel 5, a small front wheel 6 at the same side, and a front traction wheel 7 at the opposite side. The traction wheels are designed to run in furrows while the third wheel runs on the "land." The normal relative height of the wheels, when plowing, is shown on Fig. 1.

8 designates a plurality of plow beams of usual form, and each having a separate mechanism for raising and lowering relatively to the frame, said mechanisms being operable simultaneously by a single lever as 9, or individually by separate levers 9ª.

Each plow beam is supported at its rear end by a pair of inclined links 10, pivoted thereto at 13 and pivotally hung from a bearing 12 on the frame 1. Said links converge toward their lower ends to brace the plow beam against swaying laterally. At the side of the forward end of the plow beam is a ratchet-wheel 14, on a shaft 15, in a bearing 16 fixed to the frame 1. On this wheel is a wrist-pin 17 which passes through the plow-beam, and projects past same for engagement with a spring dog 18. The ratchet-wheel, in the present instance, has three teeth 19, two of which are opposite each other, and the third is halfway between the two. To prevent reverse rotation, a gravity dog 20 is provided, on a fixed pivot 21. Pivoted on the shaft 15 is a pawl-arm 22 that carries a pawl 23, engaging the ratchet-teeth 19. The pawl-arm 22 has no connection with links 10 and hence can turn the ratchet-wheel a limited distance independently of said links, and thus initially raise or lower the share point before the share is bodily raised or lowered.

Mounted in bearings 24 on the underside of the frame 1 is a transverse rock-shaft 25, on which is fixed the hand-lever 9 provided with a latch and quadrant 26. Loosely-mounted on said shaft are a series of arms 27, one for each plow share, and in line with the respective pawl-arms 22. Each arm 27 is connected to its pawl-arm 22 by a pull-rod 28.

All of the pawl-arms 27 except the one at the left side of the machine, are provided with the levers 9ª, so that the plows may be operated individually when the latches of said levers are released from their respective notched sectors 9ᵇ. Sectors 9ᵇ are fixed to shaft 25 to lock therewith and to normally lock the arms 27 upon said shaft through the intermediacy of levers 9ª and their latches.

Each spring dog 18 is shaped as shown in Figs. 3 and 4 and is secured adjustably to the adjacent bearing 16 with a bolt 29 and an adjusting screw 29ª, the former of which extends through a slot 29ᵇ in the dog and the latter through the upturned forward end of the dog. Each spring dog 18 is formed with a shoulder 18' that stands in the path of the wrist-pin 17 and stops the same when the share 30 is in usual working position, as shown by full lines Fig. 3. The dog extends rearwardly as shown, then laterally as at 18'', below the platform and passes up through the latter, terminating in a foot-plate 31.

Each plow share mechanism is provided with a spring dog of the construction described, see Fig. 2.

The operation is as follows: When the lever 9 is moved to and fro with the proper stroke it actuates the arms 27, rods 28, pawl-arms 22 and pawls 23, which latter drive the ratchet wheels 14 and wrist-pins 17. When the latter ascend they lift the front ends of the beams 8, thereby tilting the shares 30 to or toward the position shown in dotted lines, Fig. 3. Further rotation of the ratchet-wheels will draw the beams forwardly, then downwardly, so it is apparent that said ratchet-wheels turn in the same direction both to raise and lower the shares. Before raising them from the position of full lines in Fig. 3, it will of course be necessary to disengage the spring dogs 18, which the operator does by depressing the pedals 31. The function of the said dogs in connection with ratchet-wheels 14 is to hold the shares down to their work. When it is desired to raise the shares out of the earth, the spring dogs are disengaged from wrist-pins 17 and the beams are moved to the dotted line positon, Fig. 3, thereby upwardly inclining the shares in front. As the whole machine is moving forward, this upward inclination of the share points will itself lift the shares and mold-boards, while the links 10 will swing forwardly as the beams are brought to the position shown in dotted lines. This is very advantageous over the known devices for lifting the shares, because with the latter the weight of the parts must be lifted out of the ground by the operator, whereas with my device the operator has only to change the angle at which the shares are suspended, and the forward motion of the plow effects the lifting. A similar advantage attaches to the reverse movement i. e., when the shares are about to be sunk into the ground to start plowing: the combined control of the beam by links 10 and the wrist-pin 17 will cause the point of the share to descend before the rear descends, thus causing the share to force itself into the ground when the machine moves forward.

The mechanism just described is not designed for holding the shares in intermediate working positions, but means have been provided for that purpose, operative by shifting the main frame up and down at the forward end thereof. Said means embodies a lever 38 for adjusting the right side of the frame up and down, and a lever 48 to adjust the left side of said frame up and down. By thus raising and lowering the front end of the main frame the shares may be adjusted to any desired depth in the soil, and after the frame has been adjusted as desired, it may be locked from accidental movement by sectors 39 and 50, adapted to be engaged, respectively, by the levers 38 and 48.

To start plowing on unfurrowed land, the operator should raise the small front wheel 6 and the front traction wheel 7 until the shares are at a required depth. As soon as there is a furrow for the front traction-wheel to run in, it will be lowered to the level of the plow shares.

The propelling mechanism for driving the plow forward or backward embodies a motor driven shaft 52, sprocket-wheels 53 and 54 fixed to said shaft, sprocket-chains 59 and 51 driven, respectively, by said sprocket-wheels 53 and 54, a telescopic shaft 67 driven by sprocket-wheel 63, and having universal couplings 66 and 69 to allow pivotal and vertical movement of the traction wheel 7, a pinion 61 fixed to shaft 67, a cog-ring 62 fixed to wheel 7 and driven by pinion 61, a pinion 56 fixed to the shaft of sprocket wheel 58, and a cog-ring 55 fixed to the traction wheel 5. Shaft 67 is journaled in an axle bracket 37 and bearings 64.

Wheels 6 and 7 have pivotal movement on members 45 and 34, respectively, so that they may be guided by steering mechanism embodying a bar 70, pivotally-connected at one end to axle bracket 37 and at its opposite end to an arm 71 secured to the axle of wheel 6, a chain 72 connected to bar 70, a shaft 73 around which said chain is wound, a worm-wheel 75 to rotate shaft 73, a worm 76 to rotate said worm-wheel, a shaft 77 on which said worm is fixed, and a hand-wheel 79 to actuate said shaft 77. The operation of hand-wheel 79 turns the axles of the front wheels simultaneously.

Having thus described my invention, what I claim, and desire to secure by Letters Patent, is:

1. In a plow, a plow beam and share pivotally suspended by a link, a ratchet-wheel having a wrist-pin connected with the front end of said beam, a pawl for turning said wheel, and manual means for actuating said pawl.

2. In a plow, a plow beam and share pivotally-suspended by a link, a ratchet wheel having a wrist-pin connected with the front end of said beam, a pawl for turning said wheel, manual means for actuating said pawl, and releasable means to check the forward motion of said wheel when the plow share is in a lowered position.

3. In a plow, a plow beam and share pivotally suspended by a link connected to said beam close to the share, a rotary element adjacent the front end of said beam, a wrist-pin on said rotary element and directly connected with said beam, manually operable means for turning said rotary element for changing the height and angle of the share, whereby the share point is initially raised or lowered in upward or downward movement of the share, a spring dog engaging said wrist-pin for stopping said rotary element when the share is in lowered position, and means for disengaging said dog by the foot of the operator.

4. In a plow, a plow beam and share pivotally suspended by a link, a ratchet wheel operably connected with the front end of said beam, a pawl for turning said wheel, manual means for actuating said pawl, a spring dog adapted to stop said wheel when the plow share is in a lowered position, and means to disengage said dog by the foot of the operator.

5. In a plow, a frame, a rock-shaft mounted thereon, an operating lever on said shaft, a plow beam and share pivotally suspended by a link from the frame, a shaft journaled on the frame at the front end of said beam, a pawl arm loose on said shaft, a ratchet wheel on said shaft, an arm on the rock-shaft, a rod connecting said arm with said pawl-arm, a pawl on the latter for turning the ratchet wheel, and automatic means for checking the forward motion of said wheel when the plow beam and share are in a lowered position.

6. In a plow, a frame, a rock-shaft mounted thereon, an operating lever on said shaft, a plow beam and share pivotally suspended by a link from the frame, a shaft journaled on the frame at the front end of said beam, a pawl-arm loose on said shaft, a ratchet wheel on said shaft, an arm on the rock-shaft, a rod connecting said arm with said pawl-arm, a pawl on the latter for turning the ratchet wheel, an automatic spring dog adapted to stop said wheel at a variable point and to be disengaged by the foot of the operator.

7. In a plow, a plow beam and share pivotally suspended by a link, a ratchet wheel having a wrist-pin connected with the front end of said beam, a pawl for turning said wheel, means for actuating said pawl, a spring dog adapted to stop said wheel when the plow share is in a lowered position, means to disengage said dog from the wheel, and means to adjust said dog longitudinally.

8. In a plow, a plow beam and share, a link pivotally suspending the same, a ratchet-wheel having a wrist-pin connected with the front end of said beam, a pawl for turning said wheel, manual means for actuating said pawl, a spring-dog adapted to stop said wheel when the plow share is in lowered position, and an adjusting screw at the front end of said dop adapted to change the position for stopping said wheel when the plow share is lowered.

9. In a plow, a plow beam and share pivotally-suspended by a link, a ratchet-wheel having a wrist-pin connected with the front end of said pin, means for rotating said ratchet-wheel, and a spring-dog adapted to automatically move into the path of the wrist-pin at each revolution of the ratchet-wheel, said dog having a foot-piece whereby it may be pressed out of engagement with the wrist-pin.

10. In a plow, a plow beam and share pivotally-suspended by a link, a ratchet-wheel having a wrist-pin connected with the front end of said pin, means for rotating said ratchet wheel, a spring-dog adapted to automatically move into the path of the wrist-pin at each revolution of the ratchet-wheel, said dog having a foot-piece whereby it may be pressed out of engagement with the wrist-pin, and means to adjust said dog so that it may stop the wrist-pin at any predetermined point.

In testimony whereof I affix my signature, in the presence of two witnesses.

WILLIAM CLOW.

Witnesses:
F. G. FISCHER,
E. C. LILLIAN.